(12) United States Patent
Goldberg et al.

(10) Patent No.: US 8,095,569 B2
(45) Date of Patent: Jan. 10, 2012

(54) CUSTOMIZED CONTEXT MENU FOR FILES BASED ON THEIR CONTENT

(75) Inventors: Itzhack Goldberg, Hadera (IL); Ohad Greenshpan, Raanana (IL); Jonathan Joseph Mamou, Jerusalem (IL); Shmuel Ben-Yehuda, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 12/245,998

(22) Filed: Oct. 6, 2008

(65) Prior Publication Data

US 2010/0088343 A1    Apr. 8, 2010

(51) Int. Cl.
G06F 7/00 (2006.01)
G06F 17/30 (2006.01)

(52) U.S. Cl. .................. 707/802; 707/803; 707/809

(58) Field of Classification Search .............. 707/802, 707/803, 812, 793, 809, 821
See application file for complete search history.

(56) References Cited

U.S. PATENT DOCUMENTS 7,240,300 B2 *  7/2007  Jaeger ........................ 715/863
7,970,796 B1 *  6/2011  Narayanan ................. 707/802
2003/0076358 A1 *  4/2003  Nakajima et al. ............ 345/765
2007/0162898 A1     7/2007  Ramani et al.
2008/0263503 A1 * 10/2008  Polly et al. ................... 717/100
2009/0235187 A1 *  9/2009  Kim et al. .................... 715/760
2010/0005087 A1 *  1/2010  Basco et al. .................. 707/5

FOREIGN PATENT DOCUMENTS

JP    200659359    3/2006

OTHER PUBLICATIONS

D. Esposito, "Manage with the Windows Shell: Write shell extensions with C#," http://www.theserverside.net/tt/articles/showarticle.tss?id=ShellExtensions, Jun. 23, 2004, 14 pages.
SYSTAT Software, http://www.sigmaplot.com/products/Systat, 2002, 5 pages.
D. O'Reilly, "Bulk Up Your Context Menu with FileMenu Tools," Workers' Edge, Feb. 7, 2008, 4 pages.

* cited by examiner

*Primary Examiner* — Don Wong
*Assistant Examiner* — Merilyn Nguyen
(74) *Attorney, Agent, or Firm* — Suzanne Erez; Ryan, Mason & Lewis, LLP (57) ABSTRACT

Techniques include customizing a context structure such as a context menu based on content associated with an object such as a computer file. For example, a computer-implemented method for customizing a context structure associated with an object comprises the following steps. A content analysis is performed on the object. The context structure associated with the object is modified based on at least a portion of results of the content analysis.

25 Claims, 6 Drawing Sheets

*FIG. 1A*

```
<?xml version="1.0"?>
<?xml-stylesheet type="text/xsl" href="CDA.xsl"?>
<ClinicalDocument xmlns="urn:hl7-org:v3" xmlns:voc="urn:hl7-org:v3/voc" xmlns:xsi="http://www.w3.org/2001/XMLSchema-in:CDA.xsd">
  <typeId root="2.16.840.1.113883.1.3" extension="POCD_HD000040"/>
  <templateId root="2.16.840.1.113883.3.27.1776"/>
  <id extension="c266" root="2.16.840.1.113883.19.4"/>
  <code code="11488-4" codeSystem="2.16.840.1.113883.6.1" codeSystemName="LOINC" displayName="Consultation not
  <title>Good Health Clinic Consultation Note</title>
  <effectiveTime value="20000407"/>
  <confidentialityCode code="N" codeSystem="2.16.840.1.113883.5.25"/>
  <languageCode code="en-US"/>
  <setId extension="BB35" root="2.16.840.1.113883.19.7"/>
```

*FIG. 1B*

```
<?xml version="1.0" encoding="UTF-8"?>
<typeSystemDescription xmlns="http://uima.apache.org/resourceSpecifier">
<name>SapirSpeechTypes</name>
<description>Sapir Type System - Speech</description>
<version>1.0</version>
<vendor/>
<types>
    <typeDescription>
        <name>eu.sapir.contentmanagement.uimatypes.speech.SpeechArtifact</name>
        <description/>
        <supertypeName>uima.cas.TOP</supertypeName>
        <features>
```

FIG. 2

```xml
<?xml version="1.0" encoding="UTF-8"?>
<ApplicationEventsAssociation>
   <Event id="ev1" name="ev1"/>
      <Functions>
         <Function name="fn1" application="ap1"/>
         <Function name="fn2" application="ap2"/>
         <Function name="fn3" application="ap2"/>
      </Applications>
   </Event>
   <Event id="ev2" name="ev2"/>
      <Functions>
         ...
      <Functions>
   </Event>
</ApplicationEventsAssociation>
```

CUSTOMIZED CONTEXT MENU FOR FILES BASED ON THEIR CONTENT

FIELD OF THE INVENTION

The present invention relates to computer object management and, more particularly, to techniques for customizing a context structure such as a context menu based on content associated with a computer object such as a computer file.

BACKGROUND OF THE INVENTION

In an operating system, such as Windows™ Operating System (trademark of Microsoft Corporation, Redmond, Wash.), a context menu is the menu that is opened on the screen when the user clicks on the right mouse button when the cursor is on or in the vicinity of a file, folder, application title bar, or nearly any other object on the screen. Most of the time, this menu includes a list of actions appropriate to the object on which the user has clicked. Options in the context menu are fixed and typically do not change, e.g., "Copy," "Paste," "Delete," "Rename," "Open," and "Properties," to name a few.

Options depend upon the type of file that is defined by its extension. For example, in Windows™, an executable file has an ".exe" extension at the end of the filename. Thus, the context menu for an ".exe" file will also typically include a "Run as" option item.

Some applications, e.g., Winzip™ (trademark of Winzip Computing, Mansfield, Conn.) are able to add their own items (e.g., add to zip file), extending the power of the context menu paradigm.

SUMMARY OF THE INVENTION

Principles of the present invention provide techniques for customizing a context structure such as a context menu based on content associated with an object such as a computer file.

For example, in one embodiment, a computer-implemented method for customizing a context structure associated with an object comprises the following steps. A content analysis is performed on the object. The context structure associated with the object is modified based on at least a portion of results of the content analysis.

In an illustrative embodiment wherein the object is a computer file and the context structure is a context menu, the operating system uploads the computer file and runs a set of one or more tests in accordance with one or more content analyzers. A successful result from a test produces an event which is stored in a description file of the computer file. The context menu is modified by the steps of the operating system detecting a selection of the computer file (e.g., a user right-clicking on the computer file), the operating system reading from the description file the stored event, the operating system extracting from an association file at least one function, and the operating system adding the extracted function to the context menu.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the present invention will be described below from the perspective of a file and its context menu; however, it is to be understood that principles of this invention are generally applicable to other context structures associated with other computer objects.

It is realized that the file context menu is a very handy tool to perform operations on files in a file system, such as is supported by an operating system. The context menu depends upon the type of file and, in some cases, some applications are able add their own items. However, existing context menus are not dependent on the content of the files with which they are associated.

Since a given file extension can contain two types of files, principles of the invention realize that it would be advantageous for each file to have its own context menu wherein content of the files is taken into account in creating the separate context menus. Thus, a main idea of the present invention is to enable customization of file context menu based on file content analysis. Before describing detailed methodologies for achieving such an advantageous result, we give a few examples of files and how they are treated with respect to existing context menu approaches:

1. Mp3 files can contain voice and music. Files which contain voice might have options which are not relevant to music, such as transcription, and vice versa. However, under existing approaches, they are treated the same way from the file system perspective, and therefore have the same context menu.

2. XML (eXtensible Markup Language) is a general file type for structured and semi-structured data. There are many types of data stored in XML files. They can be web-services, electronic health record of patients, configuration files for Java project, etc. However, under existing approaches, they are treated the same way from the file system perspective, and therefore have the same context menu. Principles of the invention realize that it would be better that a double-click on an electronic health record would open the file in an electronic health record viewer, while the configuration Java project file would best be opened in a Java Integrated Development Environment (IDE), e.g., such as the open source software platform known as Eclipse.

3. Java files can contain a main method and will therefore be able to be run, while some others do not. The first type would rather have a "run" option, while the others would not.

There are many ways to determine the file type. Some rely on the file extension, and some on some file content. Different operating systems have traditionally taken different approaches to this problem, with each approach having its own advantages and disadvantages. Among these, the well-known approaches use the file-extension, use so-called "magic numbers," or use file metadata.

The Unix™ (a trademark of the Open Group, San Francisco, Calif.) utility program file can read and interpret magic numbers from files, and indeed, the file which is used to parse the information is called magic. For Windows™, there is a freeware utility called "TrID" that has a similar purpose.

On top of these technologies, we propose to add an additional layer of content analysis in order to extend the classification granularity. The results of the analysis could be cached with the file using file system extended attributes or other mechanisms in order to offset the cost of analysis. File-system notification mechanisms such as "inotify" (Linux) could be used to invalidate the cached data once the file content changed.

We propose to use content analysis technologies in order to customize the file context menu according to the file classification. Once files have been classified based on their content, many new operations become possible and can be added to the content-sensitive context menu, by way of example only: "show me all other files which have pictures of grandma," or more generally, "do to this file whatever I did to the last file that had the same content."

We present the following example. Assume we have two XML files. An operating system would recognize them both as the same type, i.e., XML files. However, content-based analysis would infer that:

XML documents similar to the first one are opened with an application for clinical documents; and XML documents similar to the second one are opened with a UIMA (Unstructured Information Management Architecture) plug-in of Eclipse.

Figure 1A:
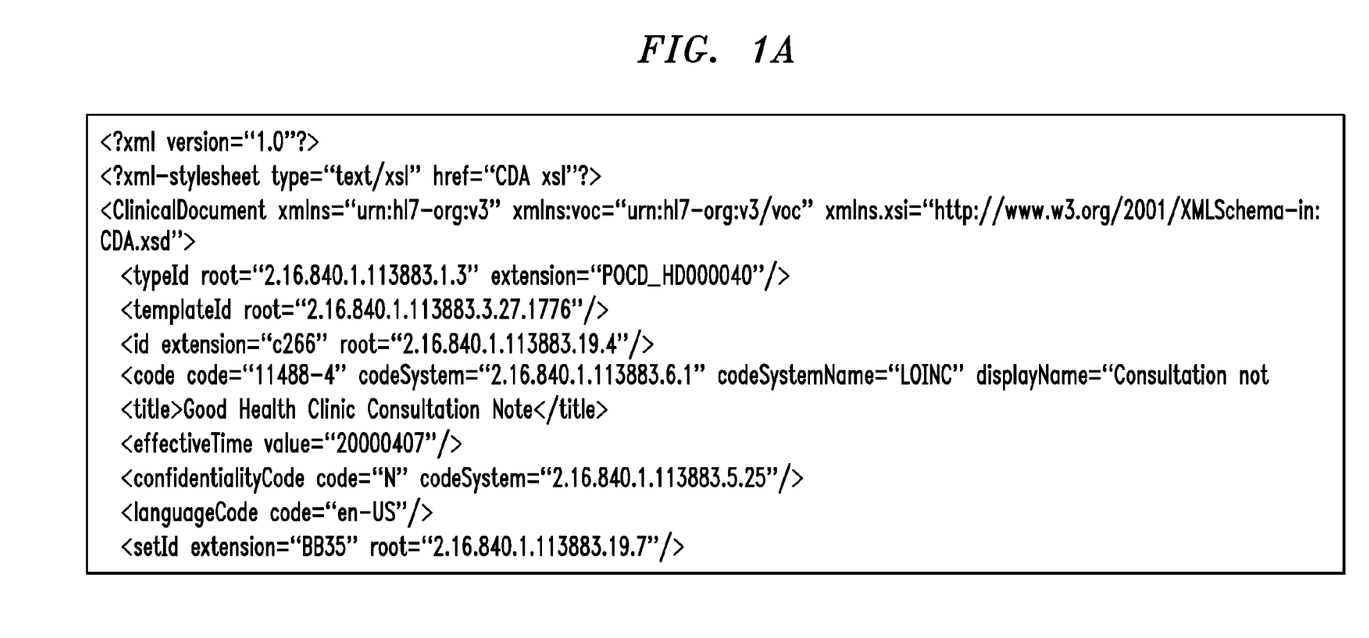
FIG. 1A is a diagram illustrating a first XML file for use in understanding principles of the invention.
Figure 1B:
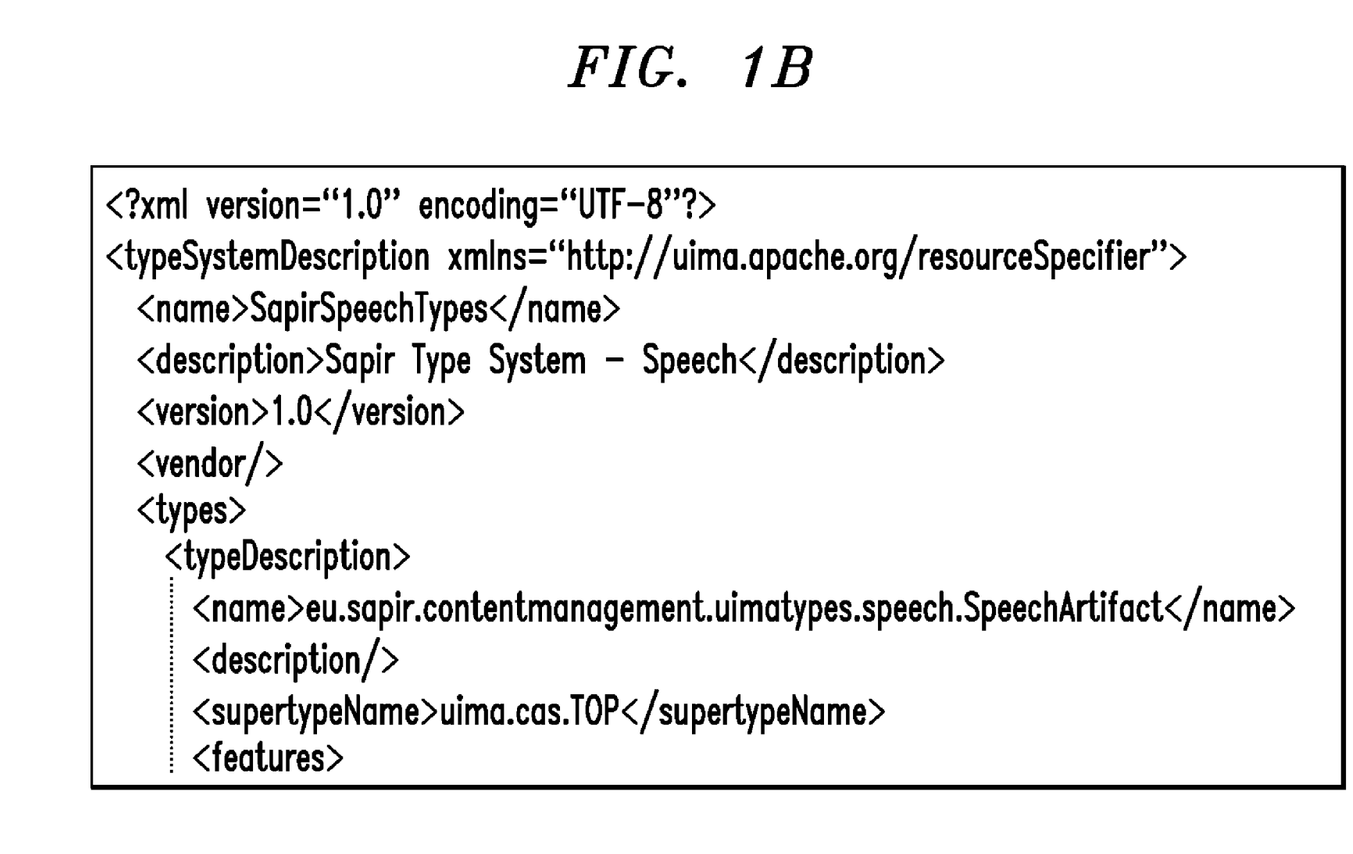
FIG. 1B is a diagram illustrating a second XML file for use in understanding principles of the invention.

For example, in the context menu of the two XML files respectively shown in FIGS. 1A and 1B, the "open" command will open the XML files using a different application—a clinical application in FIG. 1A and a UIMA application in FIG. 1B.

As we describe illustrative embodiments for customizing a context menu based on a content analysis, we use the following illustrative definitions:

Event: an event is an occurrence in a file, and is associated with a certain function of an application. Example: speech, music, UIMA XML file, etc.

Function: a function is a portion of code within a larger application, which performs a specific task. Example: play, transcribe, open, etc.

Figure 2:
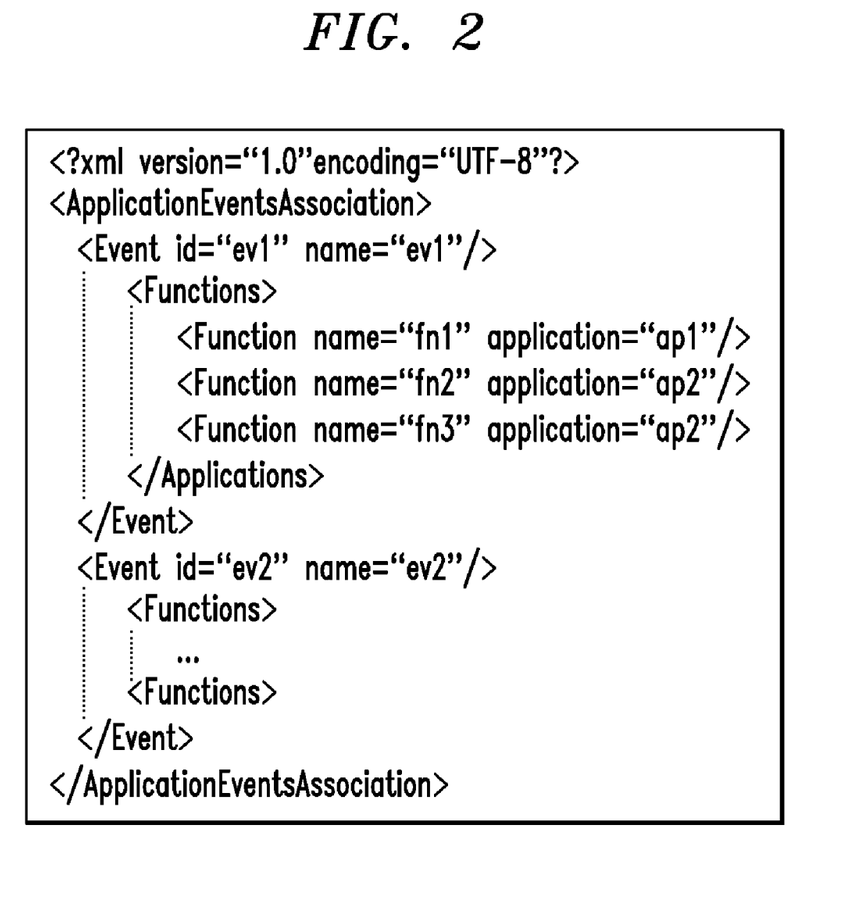
FIG. 2 is a diagram illustrating a third XML file for use in understanding principles of the invention.

Analyzer: a program that performs tests (one or more) and assigns their results as events of the file. In a narrative way, such tests could answer the following questions when examining the file: "is it a speech file?", "is it a clinical document?", etc. The events could be, again in a narrative way, "it's a speech file", etc. The operating system will save such events as codes, with an appropriate name explaining the event, as shown in FIG. 2.

Application software: Application software is a subclass of computer software that applies the capabilities of a computer directly and thoroughly to tasks (associated to functions) that the user wishes to perform.

Description File: A description file is a metadata file associated to a content file f in which the events of f are stored.

Association File: The operating system owns a relation <event, function> storing the association between any event and the list of functions that are able to support it. This function name will appear in the context menu opened when the file is clicked. For example: when the event "medical document" was determined, it is associated with the function "summarize" of the application "myMedicalDocument". This relation is being updated dynamically, and is stored as a dynamic XML document, called association file, as shown in FIG. 2.

Figure 3:
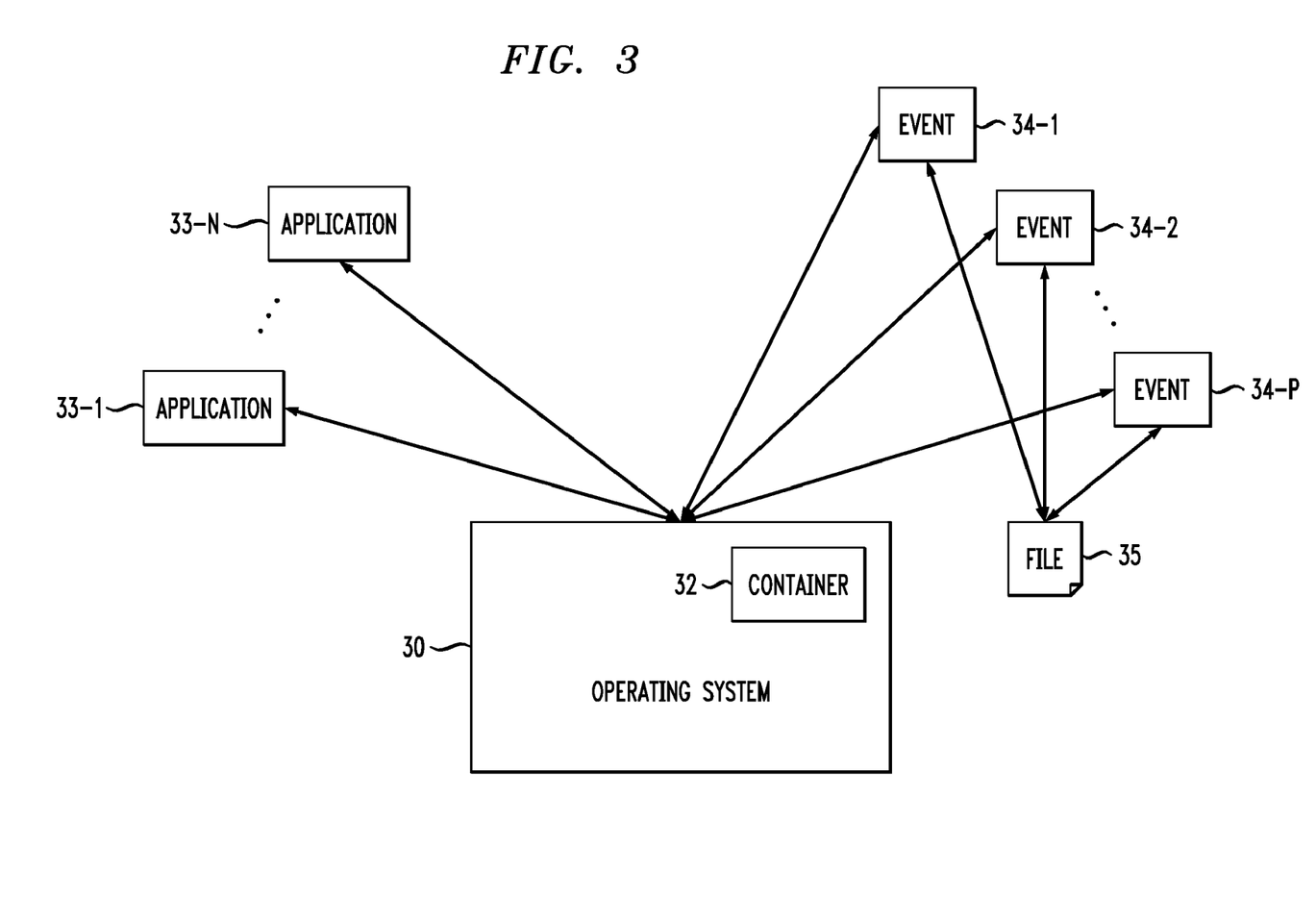
FIG. 3 is a diagram illustrating a file system for implementing context menu customization according to an embodiment of the invention.

In accordance with an illustrative embodiment, as illustrated in FIG. 3, operating system 30 stores a set of one or more analyzers in container 32 which will be run on any file being uploaded to the system from applications 33-1 through 33-N. When a file is uploaded to the file system, the operating system runs the set of analyzers, in order to identify the list of events 34-1 through 34-P, that occur in the file. It can be done during IDLE time or at the time of upload.

The analyzer's results, i.e., the events, are cached in a description file 35 which is associated with the file. On a modern Linux file system, we could use the file's extended attributes to store the analysis, and then use "inotify" to invalidate them when the file's contents changed.

Figure 4:
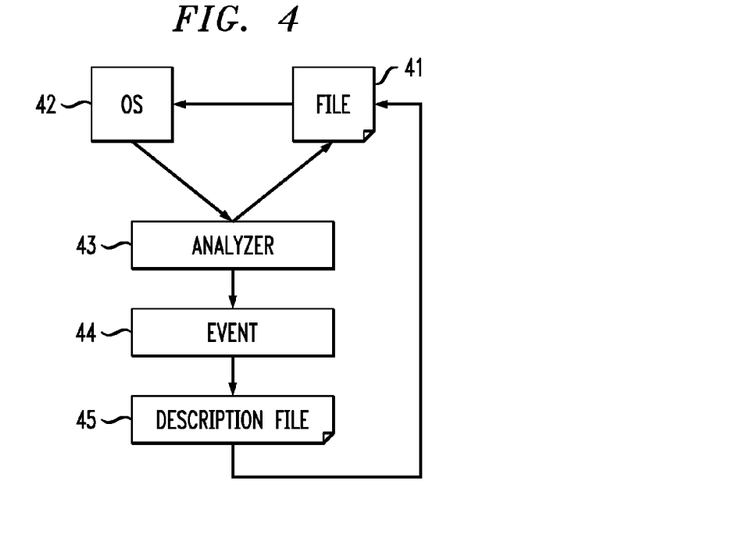
FIG. 4 is a diagram illustrating a methodology for implementing context menu customization according to an embodiment of the invention.

The flow chart of FIG. 4 describes the list of actions being performed when a file is uploaded to the file system. As shown, file 41 is uploaded to operating system 42. The operating system runs a set of one or more tests being provided by analyzer 43. A successful result from a test produces an event 44 which is being stored in the file's description file 45.

Figure 5:
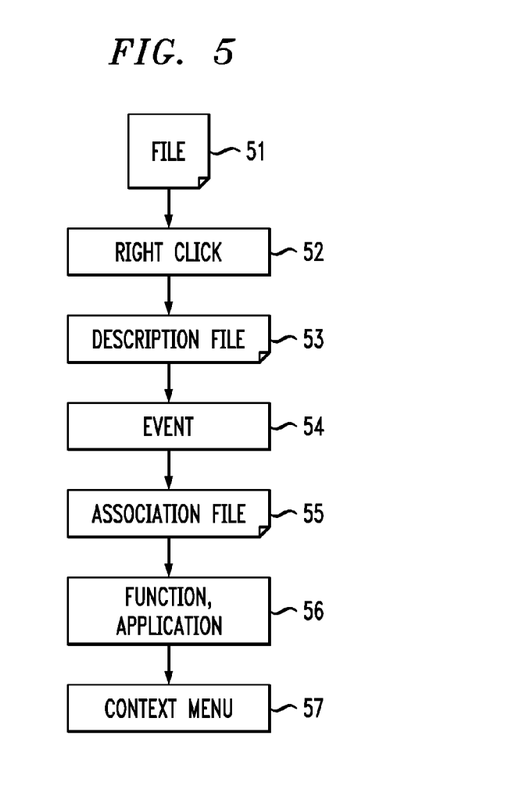
FIG. 5 is another diagram illustrating a methodology for implementing context menu customization according to an embodiment of the invention.

As shown in FIG. 5, when right-clicking 52 on file 51, the operating system reads from description file 53 the associated event(s) 54 and then extracts from association file 55 the relevant functions and/or applications 56. These functions and/or applications are then added to the context menu 57.

Thus, to summarize:
1. The right click is done on a file.
2. The list of events is extracted from the description file of the file being clicked.
3. The functions associated with the events are extracted from the association file.
4. The functions context menu items are being added to the context menu of the file.
5. Context menu of the file is shown.

When a new application is added to the system, the type of events it supports and the functions that will be invoked when these events are determined, are extracted from its specification. The association file is updated with the matching record of association: if the event exists, the application is added as one that supports it. If not, a new event is added to the file, associated with this application as supporting it. In this case where the event is new to the system, the application should also provide the analyzer(s) that, given a file, can identify whether this event occurs.

Furthermore, analyzers could be associated with the file based on the known metadata—e.g., file name extension, magic signature and known patterns. On a Linux machine, one could run magic(1) and then based on its output run a type-specific analyzer. The list of analyzers is handled by the operating system. In case the analyzer is new to the system, the list of analyzers is updated with the name and path of the new analyzer.

Figure 6:
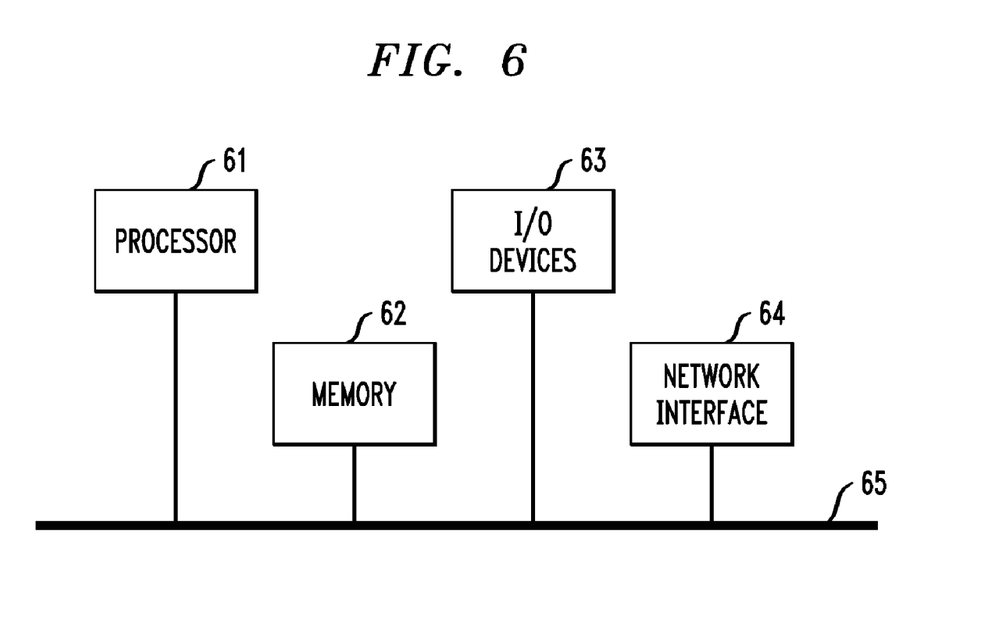
FIG. 6 is a diagram illustrating an illustrative implementation of a computing system in accordance with which one or more components/methodologies of the present invention may be implemented, according to an embodiment of the present invention.

Referring lastly to FIG. 6, an exemplary implementation 60 of a computing system in accordance with which one or more components/methodologies of the invention (e.g., components/methodologies described in the context of FIGS. 1-5) may be implemented, according to an embodiment of the present invention. For example, the exemplary implementation may represent the computing system used to implement a customization of a context menu.

As shown, the context menu customization techniques may be implemented in accordance with a processor 61, a memory 62, I/O devices 63, and a network interface 64, coupled via a computer bus 65 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. It is understood that a memory device mentioned here is example of "computer readable storage medium," which may constitute an article of manufacture when software instructions or code for implementing techniques of the invention are stored for execution thereon.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Thus, as mentioned above, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for customizing a context structure associated with an object, the method comprising the steps of:
    performing a content analysis on the object; and
    modifying the context structure associated with the object based on at least a portion of results of the content analysis;
    wherein the content analysis produces different results for objects having a same format based on respective contents of the objects.

2. The method of claim 1, wherein the context structure comprises a context menu.

3. The method of claim 1, wherein the step of modifying the context structure associated with the object further comprises one or more of adding a new item to the context structure, deleting an existing item from the context structure, and changing an existing item in the context structure.

4. The method of claim 1, wherein the object comprises a computer file.

5. The method of claim 1, wherein an operating system performs the content analysis on the object, and modifies the context structure associated with the object based on at least a portion of results of the content analysis.

6. The method of claim 1, wherein the object is a computer file the context structure is a context menu, and wherein an operating system uploads the computer file and runs a set of one or more tests in accordance with one or more content analyzers.

7. The method of claim 6, wherein a given result from at least one of the one or more tests produces an event which is stored in a description file of the computer file.

8. The method of claim 7, wherein the context menu is modified by the steps of:
    detecting a selection of the computer file;
    reading from the description file the stored event;
    extracting from an association file at least one function; and
    adding the extracted function to the context menu.

9. Apparatus for customizing a context structure associated with an object, the apparatus comprising:
    a memory; and
    a processor coupled to the memory and configured to: perform a content analysis on the object; and modify the context structure associated with the object based on at least a portion of results of the content analysis;
    wherein the content analysis produces different results for objects having a same format based on respective contents of the objects.

10. The apparatus of claim 9, wherein the context structure comprises a context menu.

11. The apparatus of claim 9, wherein modifying the context structure associated with the object further comprises one or more of adding a new item to the context structure, deleting an existing item from the context structure, and changing an existing item in the context structure.

12. The apparatus of claim 9, wherein the object comprises a computer file.

13. The apparatus of claim 9, wherein an operating system executed by the processor performs the content analysis on the object, and modifies the context structure associated with the object based on at least a portion of results of the content analysis.

14. The apparatus of claim 9, wherein the object is a computer file and the context structure is a context menu, and wherein an operating system executed by the processor uploads the computer file and runs a set of one or more tests in accordance with one or more content analyzers.

15. The apparatus of claim 14, wherein a given result from at least one of the one or more tests produces an event which is stored in a description file of the computer file.

16. The apparatus of claim 15, wherein the context menu is modified by:
    detecting a selection of the computer file;
    reading from the description file the stored event;
    extracting from an association file at least one function; and
    adding the extracted function to the context menu.

17. An article of manufacture for customizing a context structure associated with an object, the article of manufacture comprising a computer readable storage medium including one or more programs which when executed by a computer system implement the steps of:
    performing a content analysis on the object; and
    modifying the context structure associated with the object based on at least a portion of results of the content analysis;
    wherein the content analysis produces different results for objects having a same format based on respective contents of the objects.

18. The article of claim 17, wherein the context structure comprises a context menu.

19. The article of claim 17, wherein the step of modifying the context structure associated with the object further comprises one or more of adding a new item to the context structure, deleting an existing item from the context structure, and changing an existing item in the context structure.

20. The article of claim 17, wherein the object comprises a computer file.

21. The article of claim 17, wherein an operating system performs the content analysis on the object, and modifies the context structure associated with the object based on at least a portion of results of the content analysis.

22. The article of claim 17, wherein the object is a computer file and the context structure is a context menu, and wherein an operating system uploads the computer file and runs a set of one or more tests in accordance with one or more content analyzers.

23. The article of claim 22, wherein a given result from at least one of the one or more tests produces an event which is stored in a description file of the computer file.

24. The article of claim 23, wherein the context menu is modified by the steps of:
    detecting a selection of the computer file;
    reading from the description file the stored event;
    extracting from an association file at least one function; and
    adding the extracted function to the context menu.

25. A method for customizing a context menu associated with a computer file in a file system of an operating system, the method comprising the steps of:
    uploading the computer file and running a set of one or more tests in accordance with one or more content analyzers;
    storing an event in a description file of the computer file, wherein the event is produced in response to a successful result from at least one of the one or more tests;
    detecting a selection of the computer file;
    reading from the description file the stored event;
    extracting from an association file at least one function; and
    modifying the context menu in accordance with the extracted function;
    wherein the one or more tests produce different results for files having a same format based on respective contents of the files.

* * * * *